United States Patent [19]

Maruyama et al.

[11] 4,233,491
[45] Nov. 11, 1980

[54] METHOD AND APPARATUS FOR CONTROLLING INCREMENT TYPE POSITION CONTROL APPARATUS

[75] Inventors: Shigeo Maruyama; Yuji Nishikaichi; Shigeki Fujinaga; Tatsuya Miura, all of Nishinomiya, Japan

[73] Assignee: Shin Meiwa Industry Co., Ltd., Nishinomiya, Japan

[21] Appl. No.: 919,174

[22] Filed: Jun. 26, 1978

[51] Int. Cl.³ .................... B23K 9/12; G05B 19/00
[52] U.S. Cl. ................... 219/125.1; 318/572; 318/603
[58] Field of Search ............. 219/125.1; 318/561, 318/569, 572, 574, 626, 663, 603

[56] References Cited

U.S. PATENT DOCUMENTS

| | | | |
|---|---|---|---|
| 3,517,286 | 6/1970 | Stobbe | 318/574 |
| 3,641,849 | 2/1972 | Kinney | 318/572 |
| 3,795,853 | 3/1974 | Whitehouse | 318/626 |
| 3,802,622 | 4/1974 | Nishimura et al. | 318/569 |
| 3,842,331 | 10/1974 | Hendrickson et al. | 318/561 |
| 4,014,495 | 3/1977 | Oda et al. | 219/125.1 |
| 4,031,442 | 6/1977 | Poppelreiter | 318/663 |

Primary Examiner—B. A. Reynolds
Assistant Examiner—Clifford C. Shaw
Attorney, Agent, or Firm—Staas & Halsey

[57] ABSTRACT

An increment type position control apparatus is adapted to evaluate a numerical value concerning a positional point by making subtraction between the data in a position feedback counter for counting a feedback pulse from an incremental encoder and the data in a commanded position buffer from a processor. Upon depression of an origin return command button provided on a control panel, the position feedback counter and the commanded position buffer are each loaded with a predetermined value, whereupon a pitch is given, whereby an object being controlled is controllably moved in the direction toward the origin. If and when the object being controlled exceeds the origin position, the same is stopped and the counter and the buffer are each again loaded with an appropriate numerical value, whereupon a given pitch is provided, whereby the object being controlled is moved in the direction toward the origin and comes to a point to almost exceeding the origin position. Just at the timing when the object being controlled is about to pass the origin position, the position feedback counter is set, whereby the data concerning the origin is regained in the apparatus.

39 Claims, 12 Drawing Figures $X_{min} < X_a < X_{max}$
$0 < X_1 < X_2$
$Clock < X_2$

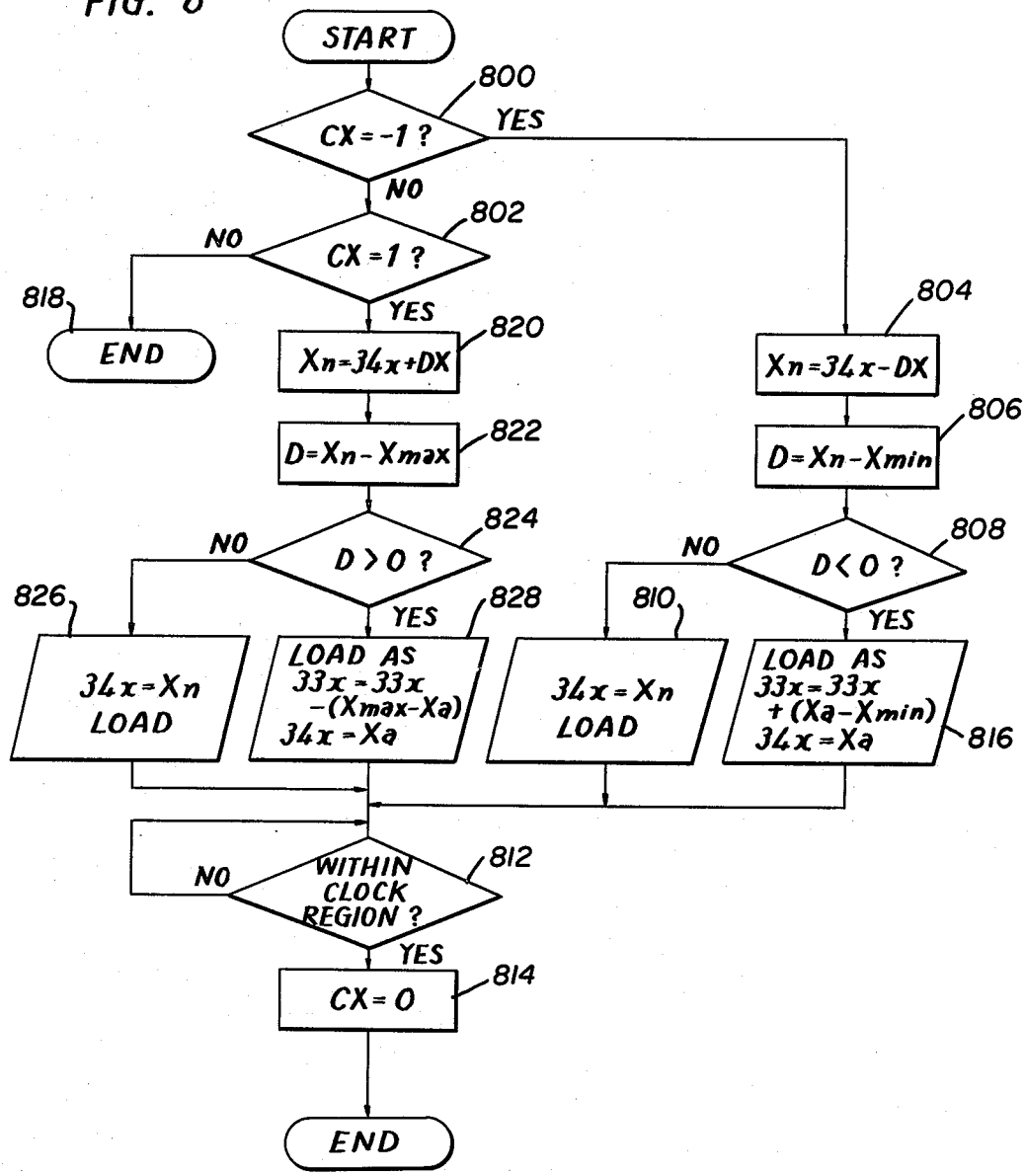

METHOD AND APPARATUS FOR CONTROLLING INCREMENT TYPE POSITION CONTROL APPARATUS

BACKGROUND OF THE INVENTION

1. Field of the Invention

The present invention relates to a method and apparatus for controlling a position control apparatus. More specifically, the present invention relates to a method and apparatus for controlling calibration of the origin position in such a position control apparatus where the position of an object being controlled is controlled in an incremental manner.

2. Description of the Prior Art

In automatic welding apparatuses, automatic painting apparatuses, other types of industrial robots, and the like, positional information concerning a point being controllably moved is programmed in terms of the coordinates for the purpose of moving a welding torch, a printing gun or spray, manipulator, and the like. Thus, the torch, or the like, is position controlled to a positional point determinable by the positional point information, for example, by means of a point to point system, simply referred to as a "PTP" system.

A so-called incremental system can be employed as a servo system for position control in such automatic welding apparatuses. As is well known, an incremental system may be defined as a system wherein each present positional point of an object being controlled is represented in terms of an incremental amount with respect to the coordinates of the previous point assumed by the object immediately before each said present positional point, and is characterized by simplicity in structure. Nevertheless, in the case where position control is effected in an incremental system, a disadvantage is encountered in that, if the apparatus is deenergized by turning off of a power supply (for example, the numerical value stored in a feedback buffer or counter for representing the present positional point of the object being controlled is volatilized and disappears), the numerical value in the buffer is not regained when the apparatus is restarted. Therefore, in the case of restart of the apparatus, the object being controlled must be brought to the origin position of the coordinates, whereupon the positional control is restarted, as is well known to those skilled in the art.

Conventionally, for the purpose of calibration of the origin position, the object being controlled had to be either directly and manaully, or through manual operation of a position control apparatus, brought to the origin position of the coordinates. However, the former is tiresome in operation, while the latter is disadvantageous in that it is difficult to stop the object being controlled correctly at the origin position. An improved system for calibration of the origin position was proposed by the same inventors, and was set forth in Japanese Patent Laid Open Application No. 111585/1976. The referenced patent laid open application appearing in the laid open gazette discloses an automatic position control apparatus wherein an origin returning means is provided for moving an object being controlled in the direction toward the origin coordinates, and the object being controlled is made to pass the origin by manually operating the origin returning means; a feedback buffer is cleared when an overrun position is reached, and the object being controlled is adapted to be automatically positioned in an appropriate position as commanded thereafter. Even with the above described improved system set forth in the referenced patent laid open gazette, a problem remains to be solved in that an open circuit servo system for manual operation is required for the origin returning means for allowing overrun of the object being controlled.

In order to solve the above described problem, and thus to eliminate the necessity of a particular servo system, one might think of loading a relatively large appropriate numerical value in the above described position feedback buffer or counter on the occasion of once again turning on the power supply, whereupon the object being controlled is moved in the direction toward the origin. However, this necessitates a register of large capacity, and accordingly makes the cost larger. Nevertheless, assuming that the same is achieved by the use of a number of digits required for ordinary position control, then other various problems are encountered in that it is impossible to allow for overrun, or the output from the encoder is obtained even after the origin position is exceeded, so as to cause run away of the object being controlled, and so on.

SUMMARY OF THE INVENTION

According to the present invention, there is provided means for generating a command signal for calibration of the origin position in an incremental position control apparatus. An appropriate predetermined numerical value is provided in response to the command signal by way of a positional command of an article being controlled, and position control is repeated based on the above described numerical value, whereby the object being controlled is allowed to overrun or to exceed the origin position, whereupon such a position is commanded as to return the object being controlled from the overrun position to the origin position again and to exceed the same, whereby the position is determined as the origin position in response to the object being controlled having passed through the original position as a result of position control responsive to the position command.

Therefore, a principal object of the present invention is to provide an improved method and apparatus for controlling an incremental type position control apparatus which is capable of calibrating the origin position with simplicity and accuracy.

Another object of the present invention is to provide an improved method and apparatus for controlling an incremental type position control apparatus which is capable of calibrating the origin position with less cost.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a flow diagram showing a count routine in the FIG. 7 embodiment;

DESCRIPTION OF THE PREFERRED EMBODIMENTS

Figure 1:
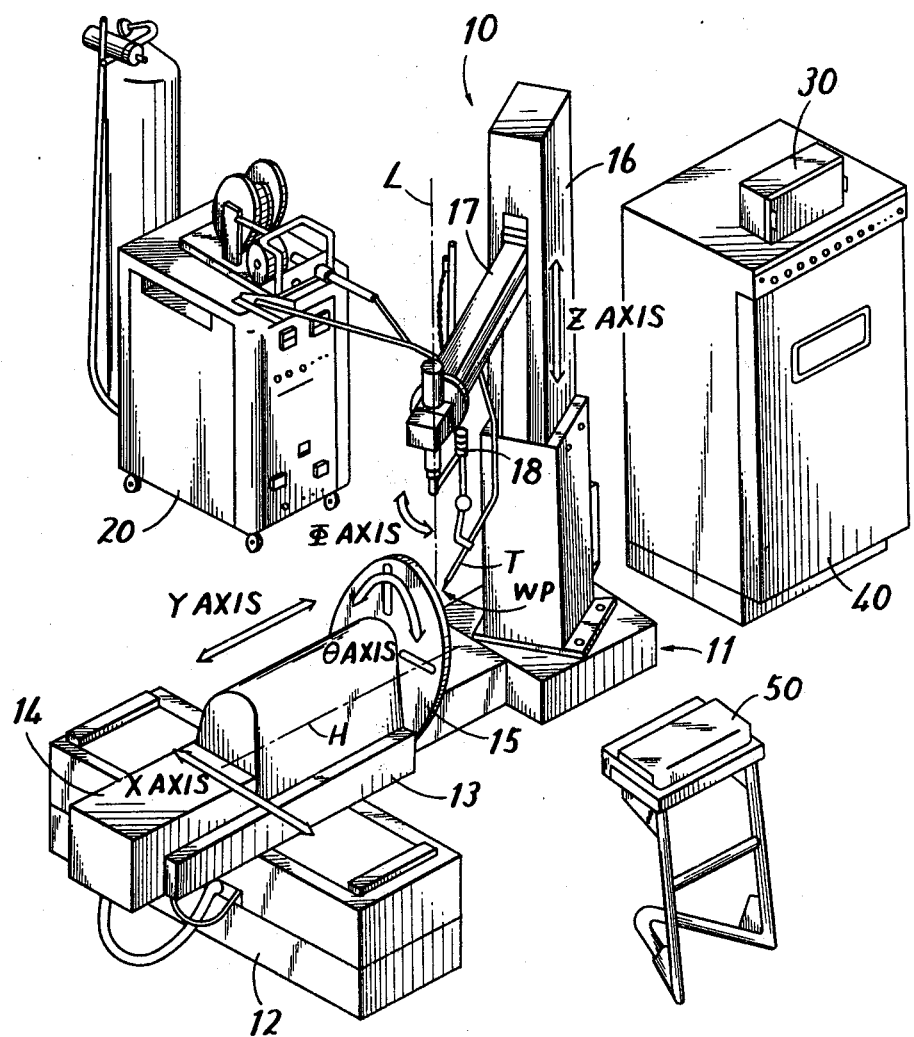
FIG. 1 shows a perspective view of one example of an automatic welding apparatus wherein the present invention can be advantageously employed.

FIG. 1 is a complete perspective view showing an automatic welding apparatus which forms the background of the present invention and wherein the present invention can be advantageously employed. The automatic welding apparatus shown is arranged such that the necessary degrees of freedom are divided between a workpiece fixture and a welding force fixture, so that the position of a workpiece or the welding torch can be controlled. Therefore, even in the case of three-dimensionally welding a workpiece of complicated shape, welding can be performed with an optimum attitude of the workpiece which provides convenient welding conditions, and the mechanical structure and the control apparatus are also simple.

Referring to FIG. 1, the automatic welding apparatus 10 shown is arranged such that a fixture 15 for fixing a workpiece (not shown) can be moved right and left and back and forth and rotated by an amount $\theta$ of rotation around a horizontal axis H (simply referred to as $\theta$ axis), and a fixture 18 for fixing a welding torch T can be vertically moved and rotated by an amount $\phi$ of rotation around a vertical axis L (simply referred to as $\phi$ axis), there being provided a control box 40 for automatically controlling the movement and rotative position of the workpiece (not shown) and the torch T.

A base plate 11 which is L-shaped in plan view has a first frame body 12 fixed to one side thereof. Mounted on top of the frame body 12 is a carriage 13 movable to the right and left or in the direction of the X-axis shown in the figure. A prime mover, not shown, for the carriage 13 may be a well known motor equipped with a reduction gear mechanism and a brake, while a power transmission means, not shown, for the carriage may be a ball-and-nut engagement means, which is often called a ball screw. Further, a second frame body 14 is mounted on the top of the carriage 13 so as to be movable back and forth in the direction of the Y-axis shown in the figure. A prime mover and power transmission means for the frame body 14, not shown, may be a similar motor equipped with a reduction gear mechanism and a brake and a ball screw. The workpiece fixture 15 is provided on the front of the frame body 14 so as to be rotatable in the $\theta$-axis direction shown in the figure. A prime mover for the workpiece fixture 15, not shown, may also be a known motor equipped with a reduction gear mechanism and a brake.

A third frame body 16 is erected on another side of the base plate 11. The third frame body 16 is provided with an arm 17 movable in the vertical direction, i.e., in the Z-axis direction shown in the figure. A prime mover and power transmission means for the arm 17, not shown, may also be a similar motor equipped with a reduction gear mechanism and a brake, and a ball screw, respectively. The arm 17 is provided at its front end with the fixture 18 for fixing the welding torch T. A prime mover for the welding torch fixture 18, not shown, may also be a known motor equipped with a reduction gear mechanism and a brake. Further, the position where the welding torch T is fixed is selected such that the welding point WP on an extension of the center line of the welding torch T is aligned with the vertical axis L, while the fixing angle thereof is suitably selected according to the manner of the welding to be performed, such as butt welding or fillet welding, and the shape of the workpiece. Further, the welding torch T is supplied with a current from a welding power source 20.

The forward and backward translation and rotation, and the rate of movment of the prime movers (such as the motors, each equipped with a reduction gear mechanism and a brake for the individual parts and the welding current), are automatically controlled by means of the control box 40 and the welding control device 30 in accordance with a program stored in the control box 40, and the relative position between the two fixtures 15 and 18 is controlled such that the welding point WP may trace a welding line on a workpiece, not shown, and thus an automatic welding operation can be performed in an attitude which provides optimum welding conditions. A remote control panel 50 is provided for manual operation and for preloading a program for that purpose.

In addition, in the example shown, since the welding point WP on an extension of the center line of a welding torch T is adapted to be aligned with the vertical axis L, the welding point remains unchanged irrespective of the rotation of the fixture 18 in the $\phi$-axis direction, and the attitude of the welding torch T with respect to the welding point WP can be optionally changed by the rotation of the fixture 18 in the $\phi$-axis direction. In other words, the automatic welding apparatus of the example shown has five degrees of freedom, i.e. the amounts X, Y and Z of displacement along the X, Y and Z axes, respectively, and the amounts $\phi$ and $\theta$ of rotation about the L($\phi$) and H($\theta$) axes, respectively.

Although not shown, the welding control device 30 is provided with a voltage regulator and a current regulator, each comprising a variable resistor and the like, as is well known in the art. Further, in order to provide for changeover between a welding machine proper mode and a welding robot mode, there is provided a robot changeover switch. This switch is normally set for the welding robot mode and is operatively associated with the workpiece.

Figure 2:
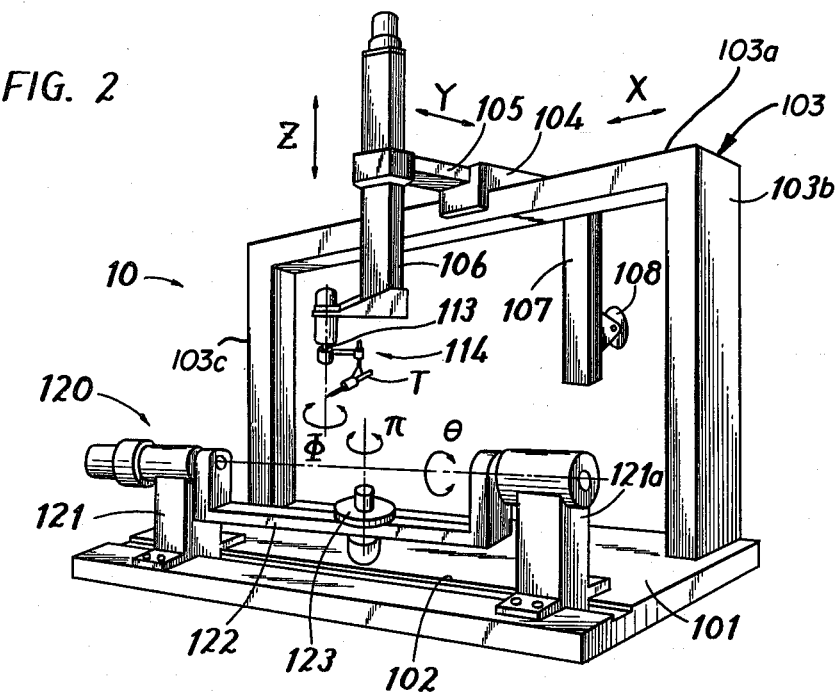
FIG. 2 shows a perspective view of another example of an automatic welding apparatus wherein the present invention can be advantageously employed.
Figure 3:
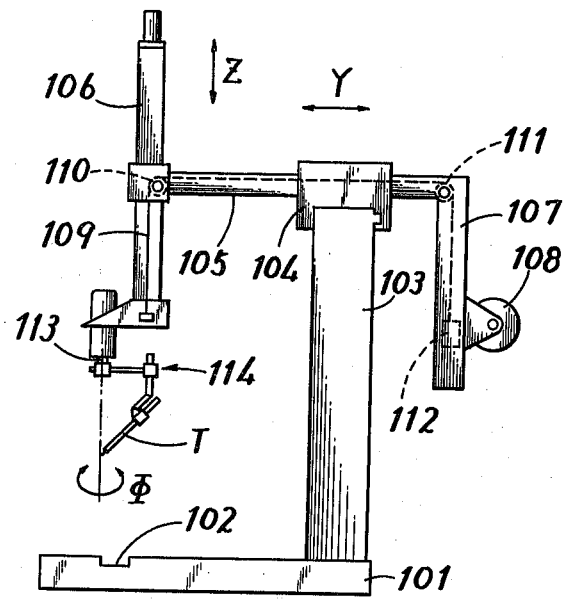
FIG. 3 shows a simplified side view of a workpiece fixture of the FIG. 2 example.
Figure 4:
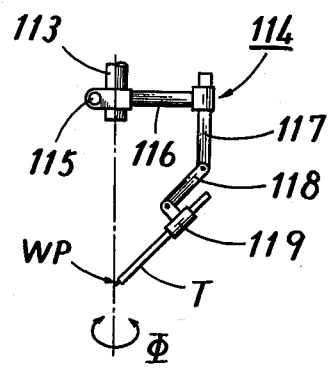
FIG. 4 shows a side view of a torch fixture of the FIG. 2 example.

FIG. 2 shows a perspective view of another preferred example of an automatic welding apparatus wherein the present invention can be advantageously employed. Since the present invention can also be employed in this type of automatic welding apparatus, a brief description of the FIG. 2 apparatus itself will first be presented. The automatic welding apparatus 10 comprises a base 101. A guide groove 102 for positioning and fixing a workpiece fixing apparatus 120 to be described subsequently is formed at one end on the upper surface of the base 101 and a guide frame 103 is mounted at the other end. The guide frame 103 comprises a horizontal portion 103a and two vertical portions 103b and 103c supporting the horizontal portion 103a and a carriage 104 is movably mounted in the X-axis direction on the horizontal portion 103a of the guide frame 103. The carriage 104 is controllably moved in the X direction by means of a prime mover, not shown. As clearly seen in FIG. 3, the carriage 104 is formed with a hollow portion extending therethrough, in which an arm 105 is slidably inserted. The arm 105 is also formed with a hollow portion extending therethrough and is bent downward at the rearend, whereby a downward extending portion 107 is formed. The arm is also controllably moved in the Y direction by means of a prime mover, not shown. A column 106 is mounted so as to be movable in the Z direction at the tip end of the arm 105. The column 106 is controllably moved in the Z direction by means of a prime mover, not shown. A shaft 113 is fixedly mounted at the lower end of the column 106, and a torch fixture 114 is mounted to the shaft 113 so as to be rotatable in the $\phi$ direction about the axis of the shaft 113. The torch fixture 114 is controllably positioned in the $\phi$ direction by means of a prime mover, not shown. As seen from FIG. 4, the torch fixture 114 comprises a horizontal directional arm 116 detachably provided to the lower portion of the shaft 113 by means of a bolt 115, a vertical directional arm 117 fixedly provided to the tip end of the arm 116, a rod 118 pivotally mounted to the lower end of the arm 117, and a torch holding member 119 pivotally and detachably provided to the tip end of the rod 118. Accordingly, the welding point WP of the torch T can be fine adjusted by pivoting the rod 118 and the holding member 119. Referring to FIGS. 2 and 3 electrode wire reel 108 is provided at the rear end portion 107 of the arm 105 for the purpose of supply of a welding electrode. As further seen in FIG. 3, a wire 109 is inserted through the hollow portion of the column 106 and the hollow portion of the arm 105 for the purpose of implementing a counter balance means. The wire 109 is set around pulleys 110 and 111 mounted in the hollow portion of the arm 105, with one end of the wire 109 connected to a hung weight 112. The weight value of the weight 112 is selected to be approximately equal to the total weight value of the column 106, the torch fixture 114 and the torch T.

Now a structure of a workpiece fixing apparatus 120 (FIG. 2) will be described. The workpiece fixing apparatus 120 comprises two support members 121a and 121, which are fitted in the guide groove 102 formed on the base 101 such that these can be fixed with an appropriate distance. A frame member 122 is fixed between these support members 121a and 121a such that each of the ends may be rotated about the axis of the corresponding support member 121a. A disc 123 serving as a workpiece fixture is provided on the frame member 122 such that the disc 123 is rotatably supported about the axis of the direction normal to the rotation axis of the frame member 122. Although not shown in the figure, the disc 123 comprises four elongated apertures extending in the radial direction, such that a workpiece can be fixed by means of these elongated apertures. The frame member 122 is controllably positioned in the $\theta$ direction, while the disc 123 is controllably positioned in the $\pi$ direction.

Figure 5:
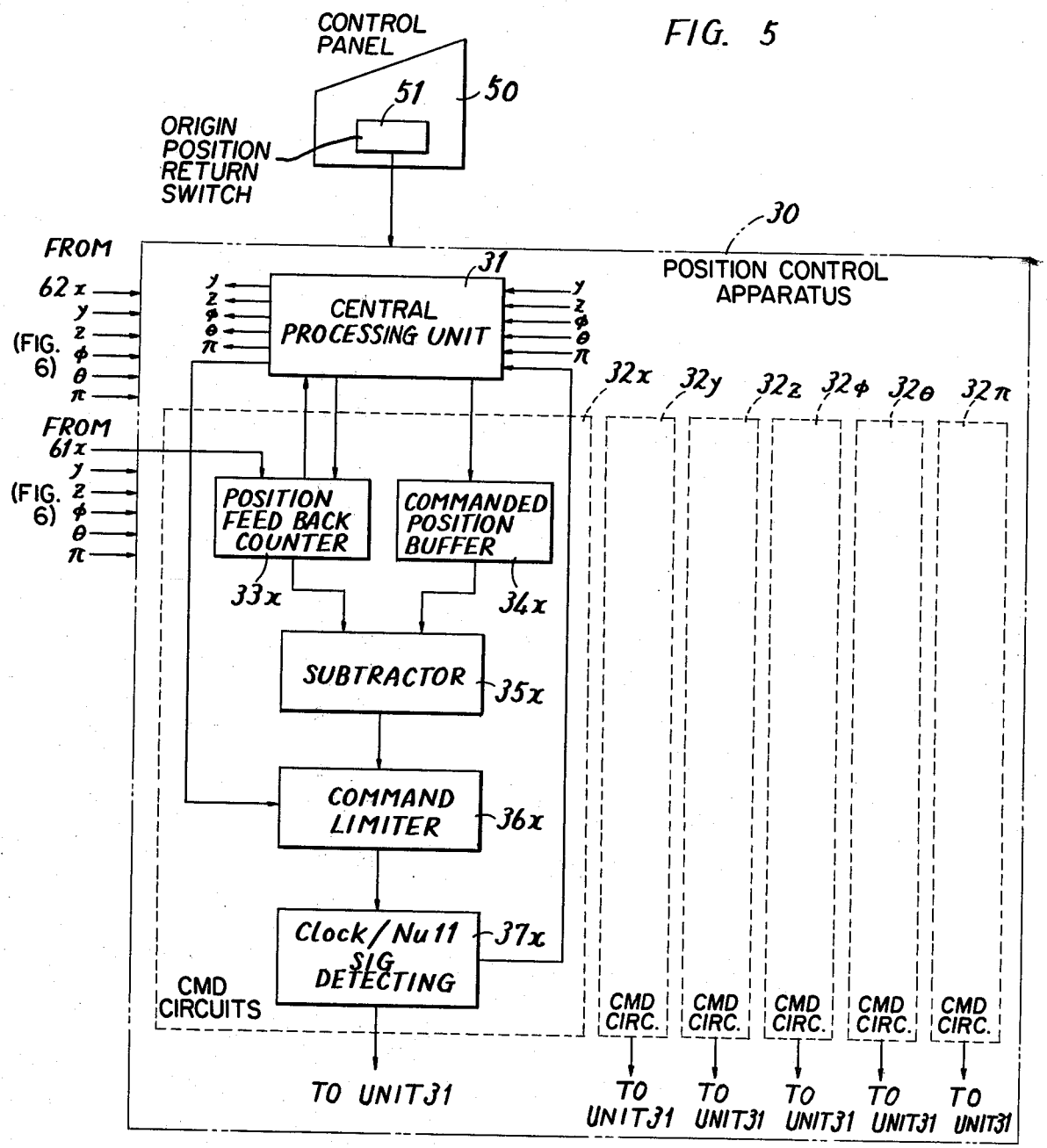
FIG. 5 shows a block diagram of a position control apparatus for use in the present invention, particularly suited for the FIG. 2 example.

FIG. 5 is a block diagram showing an outline of a position control apparatus 30 for use in the present invention. The control apparatus 30 comprises a central processing unit 31, and command circuits (CMD CIRC.) 32x, 32y, 32z, 32$\phi$, 32$\theta$, and 32$\pi$ for the respective axes X, Y, Z, $\phi$, $\theta$, and $\pi$. It is pointed out that, although a description will only be presented for the X-axis command circuit 32x as representing the others, the other command circuits 32y, 32z, 32$\phi$, 32$\theta$, and 32$\pi$ are each implemented in substantially the same circuit configuration.

The X-axis command circuit 32x comprises a position feedback counter 33x for counting a pulse signal obtainable from an incremental encoder to be described subsequently so as to provide data concerning the present position of an object being controlled, and a commanded position buffer 34x for loading data concerning a commanded position in terms of the X-axis from the above described processing unit 31. The above described position feedback counter 33x can be loaded with data concerning a commanded position, obtainable from the processing unit 31, as well as providing data concerning the present position of the object being controlled to the processing unit 31. Both the position feedback counter 33x and the commanded position buffer 34x are coupled to two inputs of a subtractor 35x.

Figure 6:
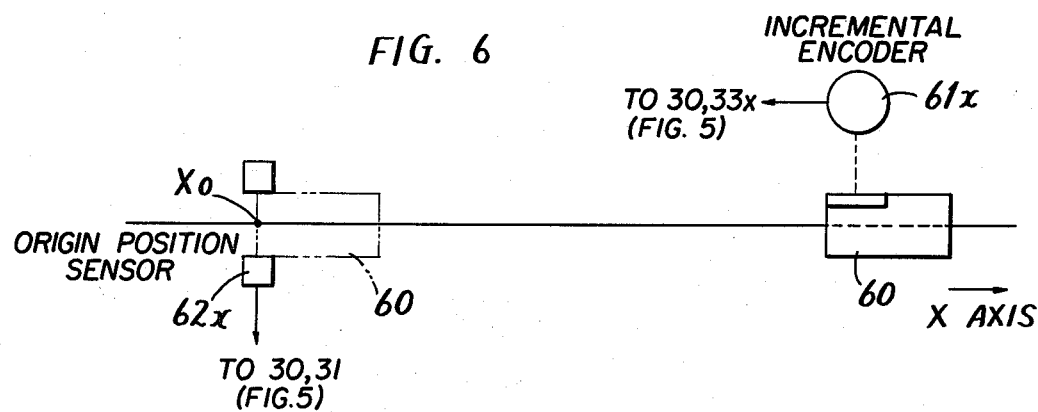
FIG. 6 shows a view showing the relation of an object being controlled to an origin position sensor with respect to the X-axis.
Figure 10:
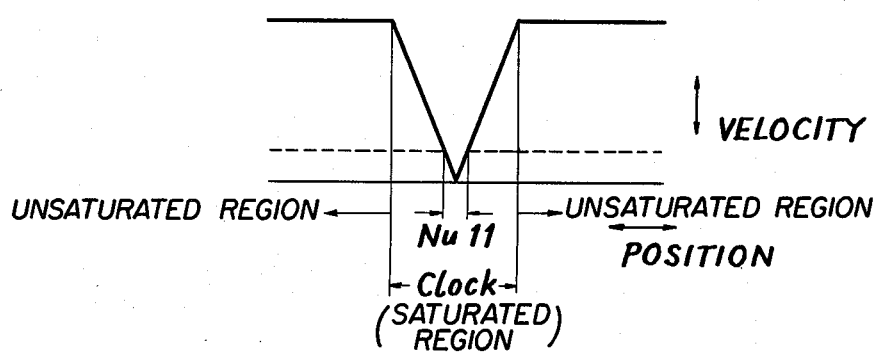
FIG. 10 is a graphical plot of speed (velocity) vs. position in a servo system, particularly showing Clock (saturated) and Null regions of speed variation with respect to the object position.

The output of the subtractor 35x is applied to a command limiter circuit 36x. The command limiter circuit 36x is structured to receive the data concerning the velocity in the X-axis direction from the processing unit 31 for limiting the moving velocity of the object being controlled. A Clock/Null signal detecting circuit 37x for detecting a Clock/Null signal to be described subsequently with reference to FIG. 10 is structured to receive the output from an X-axis servo system, and to generate a signal upon detection of the object being controlled entering a Clock (saturated) region or a Null region, to be described subsequently. The X-axis servo system comprises the X-axis command circuit 32x (FIG. 5) and incremental encoder 61x (FIG. 6). A Clock signal or a Null signal obtainable from the Clock-/Null signal detecting circuit 37x is applied to the above described processing unit 31, thereby to request the next position command, whereby a position command is applied to the above described X-axis servo system.

As shown in FIG. 6, the above described X-axis servo system serves to control the movement of the object 60 being controlled along the X-axis. The X-axis servo system comprises an incremental encoder 61x, which provides a pulse signal (associated with the movement of the object 60 being controlled) to the position feedback counter 33 in the X-axis command circuit 32x of the above described control apparatus 30 (FIG. 5). An origin position sensor 62x is provided at the origin position X0 of the X-axis for the purpose of detect when the above described object 60 being controlled has reached the above described origin position. The origin position sensor 62x may comprise a photoelectric switch, a vicinity switch, any other type of mechanical switch, or the like, which is structured to be turned on when the object 60 being controlled is just on the sensor position, thereby to provide a signal to the processing unit 31 of the above described control apparatus 30.

The control apparatus 30 is provided with a control panel 50 for the purpose of manual operation. Although not shown, the control panel 50 is provided with toggle switches for manually commanding the positions with respect to the respective axes X, Y, Z, $\phi$, $\theta$, and $\pi$, and an origin position return switch 51 for commanding a return to the origin position. Each of the respective toggle switches is structured such that downward depression thereof causes movement of the object 60 being controlled in the direction toward the origin position such as X0, and the upward depression thereof causes movement of the object 60 in the opposite direction, so that the movement is continued during a period of time associated with depression of the switch, while the movement is discontinued when the switch is brought to a neutral position. The above described origin position return switch 51 may alternatively be provided on the control apparatus 30.

Figure 7:
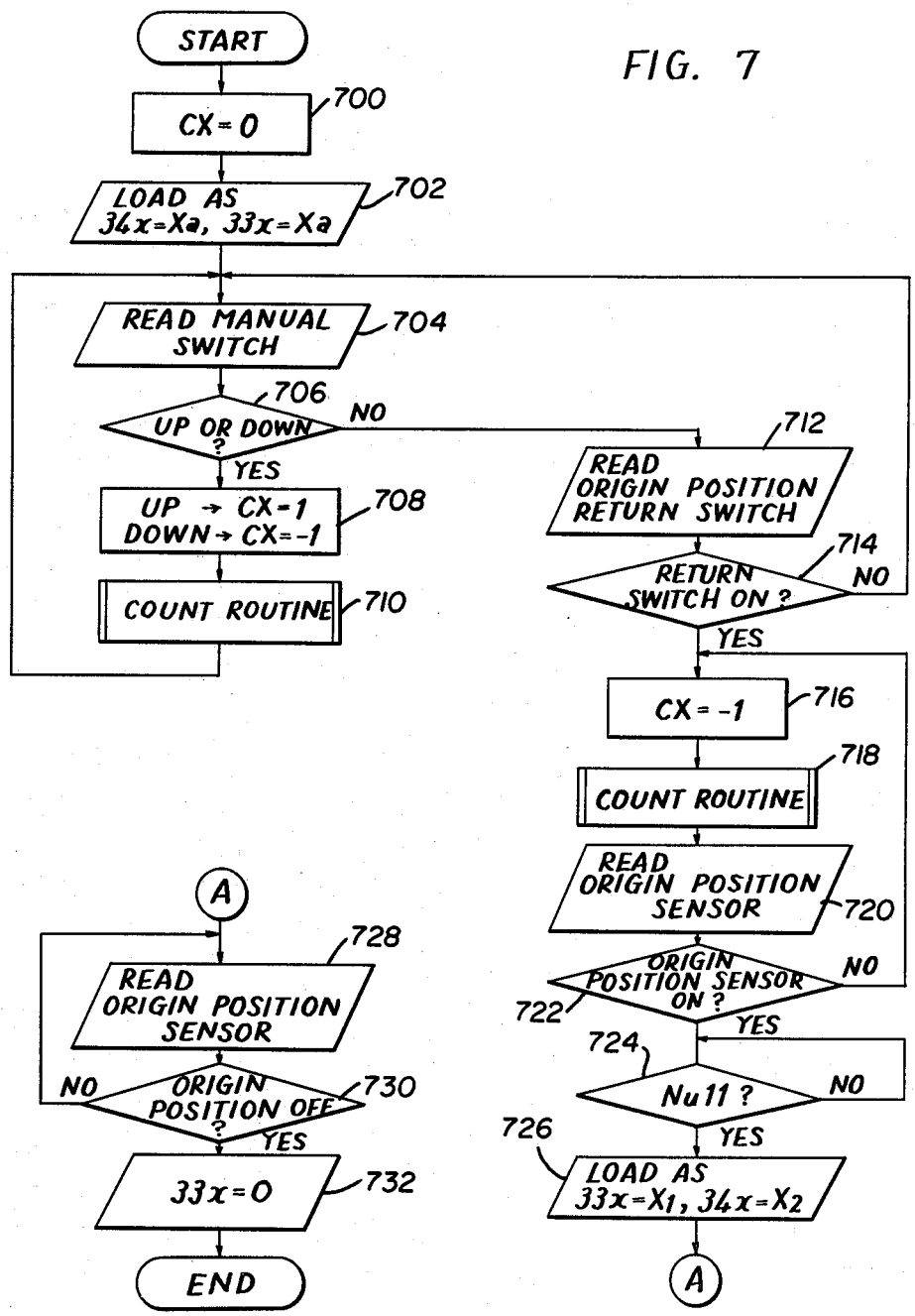
FIG. 7 shows a flow diagram for one embodiment of the present invention.

Referring to FIGS. 7 and 8, flow diagrams for explanation of the operation of the present invention are shown and description will be first made of how the origin position of the object 60 being controlled is calibrated with respect to the orthogonal coordinates. Again it is pointed out that the operation with respect to the X-axis will be described as representing the other orthogonal axes, while description with respect to the Y- and Z-axes will be omitted.

Referring to FIGS. 5 and 7, in operation, a counter flag CX in the processing unit 31 is set to zero (block 700) in response to a signal obtainable upon turning on the power supply. Simultaneously, a given value Xa in terms of the X-axis direction is commanded from the above described processing unit 31. More specifically, referring to FIG. 9, an approximate intermediate value Xa in terms of the X-axis is loaded in the commanded position buffer 34x and the position feedback counter 33x, i.e. $34x = Xa$, and $33x = Xa$ (FIG. 7—block 702).

Then, the processing unit 31 reads in the data as set by the X-axis manual toggle switch, not shown, on the above described control panel 50 (block 704). Thus, a decision is made in accordance with which direction the above described X-axis manual toggle switch is depressed, upward or downward (block 706). If the decision is "YES", i.e. the decision is a manual position control manner, then the above described count flag CX is brought to "1" in case of upward depression and is brought to "−1" in case of downward depression (block 708). As a result, a counter routine, as shown in detail in FIG. 8, is assumed (block 710).

In case of the manual mode, referring to FIG. 8 the processing unit 31 makes a decision as to whether the count flag CX is "−1", i.e. as to whether downward depression implying the movement in the direction toward the origin position has been assumed (block 800). If the decision is "NO", then a further decision is made as to whether or not CX=1, i.e. upward depression implies the movement in a direction away from the origin position has been assumed (block 802). The movement direction through manual control is selected as described above in either positive or negative, because, immediately after the power supply is turned on, the state of the positioning apparatus or the servo system, and thus the position of the object 60 being controlled, is uncertain, which means that, if the object 60 being controlled as it stands had been moved toward the origin position in such a situation, then the object 60 being controlled could have come into contact with, with, another object 60 being controlled or (workpiece).

If the decision is "YES" in the decision step "CX=−1?" (block 800), then the processing unit 31 evaluates the value of the next commanded position Xn. The same is evaluated by subtracting from the value of the present position X a predetermined count number, i.e. a pitch, DX, thereby to evaluate the value $Xn = 34x - DX$ (block 804). Then the processing unit 31 evaluates a decision equation $D = Xn - Xmin$ (block 806 see also FIG. 9). In this case, Xmin has been set to be smaller than any given value Xa. Therefore, decision is made as to whether the decision equation D is negative, i.e. $D < 0$? (block 808).

In the initial condition, the pitch DX is extremely small and the decision equation D is positive, i.e. the decision is "NO". Therefore, the processing unit 31 loads the commanded position Xn evaluated above in the commanded position buffer 34x (block 810). Accordingly, the X-axis servo system, i.e. the positioning apparatus, moves the object 60 being controlled to the above described position Xn.

The signal detecting circuit 37x serves to detect whether the object 60 being controlled has entered the Clock (saturated) region shown in FIG. 10, which shows the state of the velocity of the servo system for the purpose of illustratively explaining the above described Clock and Null signals. Referring to FIG. 10, the abscissa indicates the position, and thus the timing, while the ordinate indicates the velocity. As seen in FIG. 10, the above described Clock signal may be defined as a signal representative of the fact that the positioning apparatus has entered the servo, or saturated region of the servo system, and the velocity thereof begins to be reduced. On the other hand, the above described Null signal may be defined as a zero signal obtainable from the servo amplifier when the object 60 being controlled by the servo system is brought, by the servo system to a region extremely close to the target position, i.e. at the time when the object 60 is about to stop. In other words, the Null signal is obtained at a prescribed position irrespective of the velocity, while the Clock signal is changeable as to timing when the same is obtainable in association with the velocity. Accordingly, the embodiment shown has been structured to detect either the Clock signal or the Null signal. In addition, in the above described case, the Clock signal is detected in order to make the next commanded position precede the present position with certainty.

Whenever the Clock signal is obtained (block 812), the processing unit 31 makes the count flag CX be zero, i.e. CX=0 (block 814). Thereafter, the processing unit 31 is returned again to the main routine shown in FIG. 7, whereupon the data set by the manual toggle switch is read (block 704). More specifically, insofar as the manual toggle switch has been operated, the subroutine shown in FIG. 8 is repeated. After repetition of the above described operation, the object 60 being controlled reaches the position Xmin shown in FIG. 9, so that the next position Xn exceeds the said point Xmin. Accordingly, the above described decision equation D turns to be negative.

If and when the above described decision equation D is negative, i.e. the decision is "YES" (FIG. 8—block 808), the processing unit 31 loads the value $33x + (Xa - Xmin)$ in the position feedback counter 33x and the value Xa in the commanded position buffer 34x (block 816). The reason is that, insofar as the manual toggle switch is operated without changing the relation between the present position Xmin Dmin of the object 60 being controlled and the commanded position, similar operations are repeated many times.

If the result of the decision "CX=−1?" is "NO" (block 800), in the subroutine or the count routine, then a further decision is made as to whether the count flag CX is "1" (block 802). If the decision is "NO", then the routine is terminated (block 818), whereby the main routine is resumed.

If the decision is "YES" in the decision step "CX=1?", then the processing unit 31 evaluates the value for the next commanded position Xn. This is evaluated by adding a predetermined count number or a pitch DX to the present position X, i.e. Xn=34x+DX (block 820). The processing unit 31 then evaluates the decision equation D=Xn−Xmax (see FIG. 8—block 822, and also FIG. 9). In this case, the value Xmax has been set to be larger than any given value Xa. Therefore, a decision is made as to whether the decision equation D is positive, i.e. D>0? (block 824).

In the initial condition, the pitch DX is extremely small and the decision equation D is negative, i.e. the decision is "NO". Therefore, the processing unit 31 loads the command position Xn thus evaluated in the command position buffer 34x (block 826). Accordingly, the X-axis servo system, and thus the positioning apparatus, serve to move the object 60 being controlled to the above described position Xn. The Clock signal is detected in the movement in order to make the next position command precede the present position with certainty. If and when the above described Clock signal is obtained (block 812), the processing unit 31 makes the count flag CX be zero, i.e. CX =0 (block 814). Thereafter, the processing unit 31 is again returned to the main routine shown in FIG. 7, whereupon the data as set in the manual toggle switch is read (block 704). More specifically, insofar as the manual toggle switch has been operated, the subroutine shown in FIG. 8 is repeated. After repetition of the above described operation, the object 60 being controlled reaches the position Xmax shown in FIG. 9, whereupon the next position Xn exceeds the above described position Xmax. Accordingly, the above described decision equation D turns to be positive.

If and when the above described decision equation D is positive, i.e. the decision is "YES", then the processing unit 31 loads the value 33x−(Xmax−Xa) in the position feedback counter 33x and loads the value Xa in the command position buffer 34x (block 828). The reason is that, insofar as the manual toggle switch is operated without changing the relation between the present position Xmax of the object 60 being controlled and the commanded position, the same operation is repeated many times.

When the above described count routine is terminated, i.e. the manual operation is terminated, the above described manual toggle switch is returned to the neutral position. Accordingly, the decision becomes "NO" in the above described decision step "upward or downward?" (FIG. 7—block 706).

Accordingly, the processing unit 31 reads therein the data as to whether or not the origin position return switch 51 of the control panel 50 has been operated (block 712). In this case, the origin position return switch 51 is turned on as a matter of course for the purpose of calibration of the origin position. If the origin position return switch 51 is turned on (block 714), then the processing unit 31 makes the count flag CX be −1, i.e. CX=−1, inasmuch as movement should be surely made in the direction toward the origin position or in the downward direction (block 716). Thus, the subroutine (FIG. 7—block 718) shown in FIG. 8 is then assumed. In this counter routine, processing corresponding to the decision being "YES" in the above described decision step "CX=−1?" is carried out.

Figure 9:
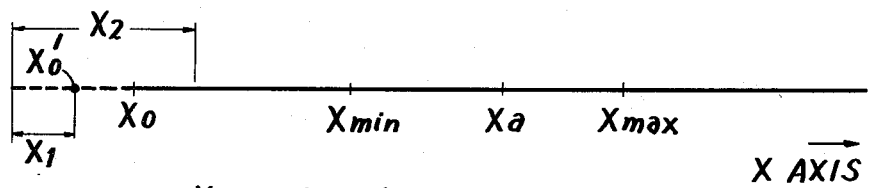
FIG. 9 is a view showing a positional relation of the object being controlled with respect to the X-axis.

Thereafter, the processing unit 31 reads therein the state of the origin position sensor 62x, as shown in FIG. 6 (see also FIG. 7—block 720). If the decision is "NO" in the decision step. "Is the origin position sensor on?" (block 722), the processing unit 31 again makes the count flag CX be "−1" (block 716), whereby the above described subroutine is repeated. At that time, the original point X0 is approached, while the origin position sensor 62x remains off. In the following step, the position command is adapted to be obtained in response to the Clock signal such that the position command precedes the present position. Therefore, the original point X0 is exceeded as shown in FIG. 9, and is overrun.

If and when the origin position sensor 62x is turned on, the processing unit 31 makes a decision as to whether or not a Null signal is obtained in the above described position control (block 724). If the decision is "YES", the object 60 being controlled is stopped by means of the servo system, whereby the object 60 being controlled is moved so as to exceed the origin position X0 for example, in FIG. 9, to the position X0'. The processing unit 31 loads the value X1 (see FIG. 9) in the position feedback counter 33x and the value X2 (see FIG. 9) in the commanded position buffer 34x (block 726). The positions X1 and X2 have been selected such that the difference "X2−X1" is larger than the distance from the present position X0' to the origin position X0. Accordingly, the X-axis servo system, and thus the X-axis positioning apparatus, move the object 60 being controlled in a direction toward the origin position X0 based on the value |X2−X1| from the subtractor 35x.

In such a situation, the processing unit 31 has read therein the "on" or "off" of the origin position sensor 62x. The object 60 being controlled has a given width, whereby the origin position sensor 62x remains on even if the object 60 being controlled is at the present position X0'. When the origin position sensor 62x is turned off (blocks 728 and 730), the object 60 being controlled is returned in a direction toward the origin position, which means that the position of the two dotted line shown in FIG. 6 is reached. More specifically, this indicates that the object 60 being controlled is brought to the mechanical origin position X0 on the X-axis. Accordingly, the processing unit 31 clears the position feedback counter 33x to zero (block 732). Thus, calibration of the origin position of the object 60 being controlled is achieved.

Calibration of the origin position is achieved with respect to each of the axes, X, Y, and Z in the manner as described in the foregoing. However, when the operation for returning to the origin position is achieved arbitrarily with respect to each of the axes, it could cause a mutual interference between the workpiece and the torch, such as a collision of the workpiece with the torch, and the like. Therefore, in case of the welding apparatus shown in FIG. 2, for example, the apparatus has been adapted such that, after such mutual interference is avoided, even if the torch T is moved vertically by manually controlling the positions of the workpiece and the torch, the origin position return switch 51 is depressed, whereupon only the Z-axis is controlled for return to the origin position. In such a case, the torch T comes to be positioned above the workpiece, not shown, whereby mutual interference does not occur. Thereafter, calibration of the origin position is effected with respect to the Y-axis, whereupon calibration is effected with respect to the X-axis. The above described steps are incorporated in the system program. In such a case, either left or right may be selected for the origin position in case of FIG. 2, with respect to the X-axis. Thereafter, calibration is effected with respect to the rotational axes.

Figure 11:
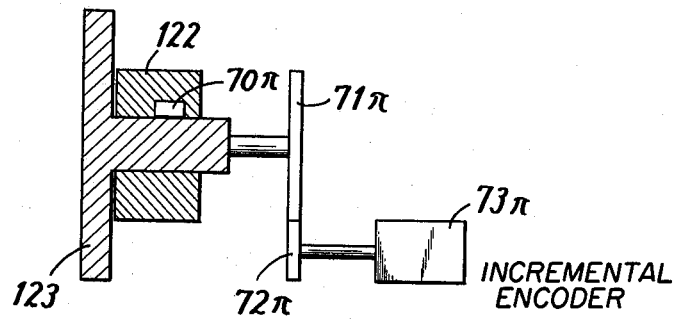
FIG. 11 is a view showing an incremental encoder as viewed along the $\pi$ axis.
Figure 12:
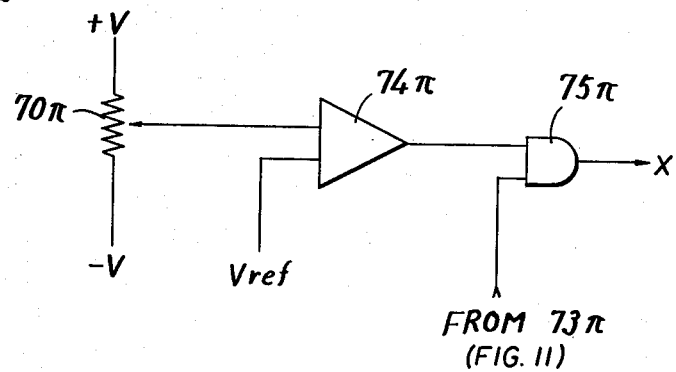
FIG. 12 is a schematic diagram of an electric circuit for providing a $\pi$ axis origin position pulse.

Referring further to FIGS. 11 and 12, description will be made of the origin position calibration with respect to the rotational axes $\phi$, $\theta$, and $\pi$. It is pointed out, however, that a description will be made for origin position calibration with respect to the disc 123, i.e. the $\pi$ axis, as representing the other axes. It should be pointed out that the origin position calibration with respect to each of the other axes $\theta$ and $\phi$ can be achieved in exactly the same manner.

The disc 123 is supported rotatably by the frame member 122. The rotation shaft of the disc 123 is provided with a potentiometer 70$\pi$ wherein a slider (not shown) can be displacable as a function of the rotation of the rotation axis. A spur gear 71$\pi$ is mounted at the rear end of the rotation shaft of the disc 123 so as to be integrally rotated. The gear 71$\pi$ is meshed with a similar gear 72$\pi$ which is directly mounted to the rotation shaft of the incremental encoder 73$\pi$. The speed ratio of the gears 71$\pi$ and 72$\pi$ is selected to be 1 to 20, so that the gear 72$\pi$ may be rotated twenty times for each rotation of the gear 71$\pi$. The encoder 73$\pi$ is structured such that one marking pulse signal is obtained for each rotation of the rotation shaft of the encoder 73$\pi$, and thus, for each rotation of the gear 72$\pi$ also.

A rotation member such as the disc 123 is structured to be rotatable at least more than 360 degrees, although to an unlimited amount. Thus, it becomes necessary to calibrate the origin position of such a rotation member. If the diameter of the rotation member is large in such a situation, the origin position return can be simply achieved by providing a mark on the outer periphery of the rotation member, and by detecting the same. However, the rotation member cannot be too large, so that a portion being welded may not be hidden when a workpiece is fixed. On the other hand, it is readily understood that too small a diameter of the rotation member degrades the accuracy in the case where the origin position calibration is to be achieved by using a mark provided on the outer periphery of the rotation member.

In consideration of the foregoing, according to another aspect of the present invention, a scheme as shown in FIGS. 11 and 12 is proposed for the purpose of the origin position calibration of the rotation member. More specifically, the apparatus is adapted such that twenty marking pulses, for example, are generated from the incremental encoder 73$\pi$ for each rotation of the rotation member, i.e. the disc 123. Accordingly, any one of the origin position pulses must be picked up among twenty marking pulses for the purpose of the origin position calibration. To that end, a potentiometer 70$\pi$ (FIG. 12) is provided in proximity to the rotation shaft of the disc 123. The potentiometer 70$\pi$ is supplied with the +V and the −V voltages at the opposite ends, while a slider rotatable in accordance with the rotation of the rotation shaft in the one-to-one ratio fashion is connected to one input of a comparator 74$\pi$. The other input of the comparator 74$\pi$ is supplied with a reference voltage Vref. Accordingly, a high level output x is obtained from the comparator 74$\pi$, if and when the voltage from the potentiometer 70$\pi$ reaches the vicinity of the reference voltage Vref, when an AND gate 75$\pi$ in the subsequent stage is enabled. The AND gate 75$\pi$ is also connected to receive a marking pulse signal from the inclemental encoder 73$\pi$. Accordingly, the AND gate 75$\pi$ is enabled, if and when the slider of the potentiometer 70$\pi$ reaches the mechanical origin position, i.e. the voltage of the potentiometer 70$\pi$ reaches the vicinity of the referenced voltage Vref, whereupon a single marking pulse is obtained from the encoder 73$\pi$. It would be appreciated that, if and when a pulse is obtained from the AND gate 75$\pi$, the origin position of the rotation member or disc 123 is calibrated. Accordingly, it is adapted such that the feedback counter of the said axis is set responsive to the origin position pulse from the AND gate 75$\pi$.

Although in the foregoing, the invention was described by taking an example of an automatic welding apparatus, it is sufficient to say that the invention can be equally employed in any other similar type of position control apparatus. Thus, according to the present invention, the origin position calibration of the object being controlled can be simply and automatically achieved in an incremental type position control apparatus, without particular necessity of additional devices.

Although the present invention has been described and illustrated in detail, it is clearly understood that the same is by way of illustration and example only, and is not to be taken by way of limitation, the spirit and scope of the present invention being limited only by the terms of the appended claims.

What is claimed is:

1. A method for controlling the position of an object being controlled by an incremental type position control apparatus through comparison of data concerning the present position of the object being controlled and data concerning a next commanded position, and for calibrating the data concerning the present position of the object being controlled to data concerning an origin position when the object being controlled passes the origin position, said method comprising the steps of:

generating a command signal for calibrating the data concerning the origin position;

forcing the data concerning the present position of the object being controlled and the data concerning a next commanded position to an appropriate given numerical value in response to the command signal;

displacing the object being controlled in a direction toward the origin position, in dependence upon the given numerical value, so as to pass the origin position;

stopping the object being controlled when the object being controlled passes the origin position;

generating additional numerical values;

displacing the object being controlled, in dependence upon the additional numerical values, so that the object passes the origin position for a second time;

stopping the object being controlled in dependence upon the data concerning the present position and the data concerning the next commanded position;

resetting the data concerning the present position of the object being controlled to initial data when the object being controlled passes the origin position for the second time, whereby the object being controlled is displaced in dependence upon the provided numerical values, and the data concerning the present position of the object being controlled is reset to initial data in dependence upon the data concerning the origin position.

2. A method in accordance with claim 1, comprising the steps of generating a pulse signal in dependence upon the movement of the object being controlled; counting the pulse signal to derive a count value, and adapting the data concerning the present position of the object being controlled so as to be represented by the count value.

3. A method in accordance with claim 2, comprising the step of comparing the count value with the data concerning the next commanded position.

4. A method in accordance with claim 1, comprising the step of providing a power supply for implementing the method in an apparatus, wherein the step of generating the command signal comprises generating the command signal upon turning on of the power supply.

5. A method in accordance with claim 1, further comprising the steps of generating an origin position return command, and displacing the object being controlled in a direction toward the origin position in response to the origin position return command.

6. A method in accordance with claim 5, comprising the step of providing a manual operation switch for implementing said method in an apparatus, and wherein the step of generating the origin position return command comprises generating the origin position return command by the manual operation switch.

7. A method in accordance with claim 1, wherein the object being controlled is adapted to work upon an object being processed, and which further comprises the step of relatively displacing the object being controlled and the object being processed with respect to at least two axes.

8. A method in accordance with claim 7, further comprising the step of avoiding a mutual interference between the object being controlled and the object being processed with respect to each of the axes.

9. A method in accordance with claim 1, comprising the steps of providing an apparatus comprising a rotation member for mounting the object being controlled and calibrating the data concerning the present position to the data concerning the origin position in dependence upon the rotation member.

10. A method in accordance with claim 9, wherein the apparatus comprises a potentiometer having a slider displacable in dependence upon the rotation of the rotation member, said method comprising the steps of generating a marking pulse signal, and calibrating the data concerning the origin position in response to the marking pulse signal when the slider is positioned at a prescribed position of the potentiometer.

11. A method in accordance with claim 10, wherein the marking pulse signal is generated by an incremental encoder coupled to the rotation member and structured to be rotated at least more than two times per each rotation of the rotation member.

12. An incremental type position control apparatus for controlling the position of an object being controlled through comparison of data concerning the present position of the object being controlled and data concerning a next commanded position, comprising:
means for providing a command signal for calibrating data concerning an origin position;
displacement means responsive to said command signal, for controllably displacing the object being controlled in a direction toward the origin position so as to pass said origin position;
means for stopping the object being controlled when the object being controlled passes said origin position;
said displacement means being responsive to said stopping and said displacement means displacing the object being controlled so as to pass said origin position for a second time; and
means for resetting the data concerning the present position of the object being controlled to an initial condition in dependence upon the data concerning the origin position when the object being controlled passes said origin position for the second time.

13. An incremental type position control apparatus in accordance with claim 12, wherein said means for controllably displacing the object being controlled comprises:
first storing means for storing the data concerning the present position of the object being controlled;
second storing means for storing the data concerning the next commanded position of the object being controlled;
comparing means for comparing the data concerning the present position and the data concerning the next commanded position stored in said first and second storing means and for generating an output signal; and
further means, responsive to the output signal of said comparing means, for controllably displacing the object being controlled from the present position to the next commanded position.

14. An incremental type position control apparatus in accordance with claim 12, further comprising origin position sensing means provided at said origin position for detecting the object being controlled and for sensing when the object being controlled passes said origin position for the second time.

15. An incremental type position control apparatus in accordance with claim 12, wherein said position control apparatus comprises an automatic welding apparatus, comprising a welding torch and a workpiece, and wherein the object being controlled comprises at least one of said welding torch and workpiece.

16. An incremental type position control apparatus in accordance with claim 15, wherein said automatic welding apparatus comprises
means for holding said welding torch, and
means for fixing said workpiece,
said displacement means controllably displacing at least one of said welding torch holding means and said workpiece fixing means along orthogonal coordinates.

17. An incremental type position control apparatus in accordance with claim 13, wherein said first storing means comprises a counter.

18. An incremental type position control apparatus in accordance with claim 17, wherein said system includes an incremental encoder for providing a pulse signal corresponding to movement of the object being controlled, said counter being responsive to said pulse signal for deriving the present position of said object being controlled.

19. An incremental type position control apparatus in accordance with claim 13, wherein said system includes an incremental encoder for providing a pulse signal corresponding to movement of the object being controlled.

20. An incremental type position control apparatus in accordance with claim 13, wherein said further means includes command limiter means responsive to the output of said comparing means for providing an output corresponding to an adjustment of the velocity of the object being controlled.

21. An incremental type position control apparatus in accordance with claim 20, wherein said further means includes clock/null signal detecting means responsive to said output of said command limiter means for detecting when the object being controlled enters a given vicinity of said commanded position.

22. An incremental type position control apparatus in accordance with claim 12, said apparatus including origin position return means for returning the object to be controlled to said origin position.

23. An incremental type position control apparatus in accordance with claim 22, wherein said origin position return means comprises a manually operable switch.

24. A method for controlling an automatic position control apparatus including feedback pulse generating means for generating feedback pulses in dependence upon displacement of an object being controlled, counter means for counting the feedback pulses and for generating data representing the current position of the object being controlled, command data generating means for generating command data for controlling the displacement of the object being controlled, command data store means for receiving and storing the command data, and displacement driving means for comparing the current position data in the counter means and the command data in the command data store means and for displacing the object being controlled along a predetermined displacement axis having an origin point position, said method comprising the steps of:
  generating a command signal when it is desired to return the object being controlled to the origin point position;
  generating and storing the command data in succession, wherein the command data represents displacement amount data corresponding to a predetermined displacement of the object being controlled as a function of the command signal;
  displacing the object being controlled in succession in the direction toward the origin point position;
  stopping the object being controlled when the object being controlled passes the origin point position;
  driving the object being controlled in a direction in dependence upon the command data such that the object being controlled passes the origin point position a second time; and
  resetting the counter means to an initial condition at the timing when the object being controlled passes the origin point position for the second time.

25. A method in accordance with claim 24, further comprising the step of providing the counter means and the command data store means with first position data prior to the step of displacing the object being controlled in the direction toward the origin point position, wherein the first position data corresponds to a first proper position on the displacement axis and is a function of the command signal.

26. A method in accordance with claim 25, wherein the first proper position is a position approximately intermediate the displacement axis.

27. A method in accordance with claim 25, wherein the step of displacing the object being controlled in the direction toward the origin point position comprises the sub-steps of:
  assuming second position data corresponding to a second position displaced by a predetermined amount from said first position on said displacement axis;
  providing command data corresponding to a difference between said first position data and said second position data to the command data store means; and
  displacing, in succession, the object being controlled by the amount equal to the difference between the first position and the second position.

28. A method in accordance with claim 27, wherein until displacement is made in succession for every displacement amount equal to the difference between the first position and the second position, command data corresponding to a relatively small displacement amount is generated by the command data generating means and provided to the command data store means or the counter means, whereby the object being controlled is displaced for every relatively small displacement amount.

29. A method in accordance with claim 24, comprising the step of providing a power supply for implementing the method in an apparatus wherein the step of generating the command signal comprises the step of generating the command signal upon turning on of the power supply.

30. A method in accordance with claim 24, further comprising the steps of generating an origin position return command, and controllably displacing the object being controlled in a direction toward the origin position in response to the origin position return command.

31. A method in accordance with claim 24, comprising the step of providing a manual operation switch for implementing said method in an apparatus, wherein the step of generating the origin position return command comprises generating the origin position return command by the manual operation switch.

32. A method in accordance with claim 24, wherein the object being controlled is adapted to work upon an object being processed, and further comprising the step of relatively displacing the object being controlled and the object being processed with respect to at least two axes.

33. A method in accordance with claim 30, further comprising the step of avoiding a mutual interference between the object being controlled and the object being processed with respect to each of the axes.

34. A method in accordance with claim 24, comprising the steps of providing an apparatus comprising a rotation member on which the object being controlled is mounted, and resetting the data concerning the present position to the data concerning the origin position in dependence upon the rotation member.

35. A method in accordance with claim 34, wherein the apparatus comprises a potentiometer having a slider displaceable in dependence upon the rotation of the rotation member, said method comprising the steps of generating a marking pulse signal, and resetting the data concerning the origin position in response to the marking pulse signal when the slider is positioned at a prescribed position of the potentiometer.

36. A method in accordance with claim 35, wherein the marking pulse signal is generated by an incremental encoder coupled to the rotation member and wherein the incremental encoder is rotated at least more than two times per each rotation of the rotation member.

37. An automatic position control apparatus, for controlling the position of an object being controlled, comprising:
   feedback pulse generating means for generating feedback pulses as a function of displacement of the object being controlled;
   counter means for counting said feedback pulses and for generating current position data representing the current position of the object being controlled;
   command data generating means for generating command data representing the desired displacement of the object being controlled;
   command data store means for receiving and storing said command data;
   displacement driving means for comparing said current position data in said counter means and said command data in said command data store means, and for displacing the object being controlled along a displacement axis having a predetermined origin point position;
   means for providing a command signal when it is desired to return the object being controlled to said origin point position;
   origin point direction displacing means for successively displacing the object being controlled by every predetermined displacement amount in the direction toward said origin point position in dependence upon said command signal;
   object detecting means at said origin point position of said displacement axis, for detecting the presence of the object being controlled at said origin point position and for providing a detection signal;
   means responsive to said detection signal for stopping the displacement of the object being controlled in the direction toward said origin point position and for generating a stop signal;
   second displacement driving means responsive to said stop signal for displacing the object being controlled in the direction such that the object passes said origin point position for a second time; and
   resetting means for resetting said counter means to an initial condition in response to the detection signal provided by said object detecting means when the object being controlled passes said origin point position for the second time.

38. An incremental type position control apparatus in accordance with claim 37, wherein said position control apparatus comprises an automatic welding apparatus, comprising a welding torch and a workpiece, and the object being controlled comprises at least one of said welding torch and workpiece.

39. An incremental type position control apparatus in accordance with claim 38, wherein said automatic welding apparatus comprises
   means for holding said welding torch, and
   means for fixing said workpiece,
   said origin point direction displacing means controllably displacing at least one of said welding torch holding means and said workpiece fixing means along orthogonal coordinates.

* * * * *

UNITED STATES PATENT AND TRADEMARK OFFICE
CERTIFICATE OF CORRECTION

PATENT NO. : 4,233,491
DATED : November 11, 1980
INVENTOR(S) : MARUYAMA et al.

It is certified that error appears in the above—identified patent and that said Letters Patent is hereby corrected as shown below:

[57] Abstract: line 19, after "point" delete "to".

Column 2, line 3, "sette" should be --zette--.

Column 3, line 59, "ball screw" should be --"ball screw"--.

Column 5, line 51, "121a and 121 should be --121 and 121a--;
         line 55, "121a" (first occurrence) should be --121--;
         line 57, after "member" insert --121 or--.

Column 6, line 50, "33" should be --33x--.

Column 7, line 61, delete "with,"; "or(" should be --(or--.

Column 8, line 2, after "806" insert --;--;

UNITED STATES PATENT AND TRADEMARK OFFICE
CERTIFICATE OF CORRECTION

PATENT NO. : 4,233,491

DATED : November 11, 1980

INVENTOR(S) : MARUYAMA et al.

It is certified that error appears in the above—identified patent and that said Letters Patent is hereby corrected as shown below:

Column 8, line 31, after "system" insert --,--.

Column 10, line 4, after "step" delete --.--;
line 21, after "XO" insert -- -- --;
line 33, after ""off"" insert --state--;
line 40, "line" should be --lines--;
line 55, after "in" insert --the--.

Signed and Sealed this

Fourteenth Day of April 1981

[SEAL]

Attest:

RENE D. TEGTMEYER

*Attesting Officer*   *Acting Commissioner of Patents and Trademarks*